US012128869B2

(12) United States Patent
McDowell

(10) Patent No.: US 12,128,869 B2
(45) Date of Patent: Oct. 29, 2024

(54) EXTERNAL COMBUSTION ENGINE SERIES HYBRID ELECTRIC DRIVETRAIN

(71) Applicant: QUANTUM INDUSTRIAL DEVELOPMENT CORPORATION, Seguin, TX (US)

(72) Inventor: Joseph Shea McDowell, San Antonio, TX (US)

(*) Notice: Subject to any disclaimer, the term of this patent is extended or adjusted under 35 U.S.C. 154(b) by 377 days.

(21) Appl. No.: 16/759,730

(22) PCT Filed: Oct. 27, 2018

(86) PCT No.: PCT/US2018/057892
§ 371 (c)(1),
(2) Date: Apr. 27, 2020

(87) PCT Pub. No.: WO2019/084527
PCT Pub. Date: May 2, 2019

(65) Prior Publication Data
US 2021/0179060 A1 Jun. 17, 2021

Related U.S. Application Data

(60) Provisional application No. 62/578,348, filed on Oct. 27, 2017.

(51) Int. Cl.
*B60W 20/10* (2016.01)
*B60K 6/24* (2007.10)
(Continued)

(52) U.S. Cl.
CPC ............... *B60W 20/10* (2013.01); *B60K 6/24* (2013.01); *B60K 6/26* (2013.01); *B60K 6/28* (2013.01);
(Continued)

(58) Field of Classification Search
CPC ...... B60W 20/10; B60W 10/06; B60W 10/08; B60W 10/18; B60W 10/30;
(Continued)

(56) References Cited

U.S. PATENT DOCUMENTS

| 4,021,677 A | 5/1977 | Rosen et al. |
| 4,313,080 A | 1/1982 | Park |

(Continued)

FOREIGN PATENT DOCUMENTS

| CN | 201002715 Y | * 1/2008 | ............. B63H 21/12 |
| CN | 100523469 C | 8/2009 | |

(Continued)

OTHER PUBLICATIONS

Sittiarttakorn, V., and S. Boonto. "Hybrid Engine Model Using a Stirling Engine and a DC Motor." Journal of the Japan Society of Applied Electromagnetics and Mechanics, vol. 23, No. 3, 2015, pp. 563-566., doi:10.14243/jsaem.23.563.

(Continued)

*Primary Examiner* — Tisha D Lewis
(74) *Attorney, Agent, or Firm* — John A. Fortkort; Fortkort & Houston PC

(57) ABSTRACT

A vehicle is provided which includes an engine; an electric motor; a drivetrain driven by the engine and the electric motor, the drivetrain including a rotatable shaft; a generator which is attached to the rotatable shaft, and which generates electrical energy in response to the rotation of the shaft; an energy recovery system; and an electrical energy storage system.

19 Claims, 5 Drawing Sheets

(51) Int. Cl.
| | |
|---|---|
| *B60K 6/26* | (2007.10) |
| *B60K 6/28* | (2007.10) |
| *B60K 6/36* | (2007.10) |
| *B60K 6/46* | (2007.10) |
| *B60R 16/023* | (2006.01) |
| *B60R 16/03* | (2006.01) |
| *B60W 10/06* | (2006.01) |
| *B60W 10/08* | (2006.01) |
| *B60W 10/18* | (2012.01) |
| *B60W 10/30* | (2006.01) |
| *B60W 30/18* | (2012.01) |
| *F01N 5/02* | (2006.01) |
| *F01N 13/10* | (2010.01) |

(52) U.S. Cl.
CPC .......... *B60K 6/36* (2013.01); *B60K 6/46* (2013.01); *B60R 16/023* (2013.01); *B60R 16/03* (2013.01); *B60W 10/06* (2013.01); *B60W 10/08* (2013.01); *B60W 10/18* (2013.01); *B60W 10/30* (2013.01); *B60W 30/18109* (2013.01); *F01N 5/025* (2013.01); *F01N 13/10* (2013.01); *B60W 2510/0676* (2013.01)

(58) Field of Classification Search
CPC .... B60W 30/18109; B60W 2510/0676; B60K 6/24; B60K 6/26; B60K 6/28; B60K 6/36; B60K 6/46; B60R 16/023; B60R 16/03; F01N 5/025; F01N 13/10
See application file for complete search history.

(56) References Cited

U.S. PATENT DOCUMENTS

| | | | |
|---|---|---|---|
| 4,382,484 A | 5/1983 | Anderson et al. | |
| 5,172,784 A | 12/1992 | Varela, Jr. | |
| 6,368,078 B1 * | 4/2002 | Palumbo | F02C 6/12 415/206 |
| 6,560,970 B1 | 5/2003 | Swift | |
| 6,644,028 B1 | 11/2003 | Swift et al. | |
| 6,658,862 B2 | 12/2003 | Swift et al. | |
| 6,925,369 B2 | 8/2005 | Obayashi et al. | |
| 7,171,811 B1 | 2/2007 | Berchowitz et al. | |
| 7,191,596 B2 | 3/2007 | Yaguchi et al. | |
| 7,231,877 B2 | 6/2007 | Kumar | |
| 7,238,139 B2 | 7/2007 | Roethler et al. | |
| 7,430,967 B2 | 10/2008 | Kumar | |
| 7,451,839 B2 | 11/2008 | Perlman | |
| 7,458,215 B2 | 12/2008 | Yaguchi et al. | |
| 7,469,760 B2 | 12/2008 | Kamen et al. | |
| 7,581,393 B2 | 9/2009 | Yaguchi et al. | |
| 7,644,581 B2 | 1/2010 | Yaguchi et al. | |
| 7,715,958 B2 | 5/2010 | Kumar | |
| 7,726,130 B2 | 6/2010 | McDowell | |
| 7,848,858 B2 | 12/2010 | Tabata et al. | |
| 8,028,660 B2 | 10/2011 | Troy | |
| 8,128,019 B2 | 3/2012 | Annati et al. | |
| 8,132,412 B2 | 3/2012 | Bennett | |
| 8,164,301 B2 | 4/2012 | Uchida | |
| 8,285,431 B2 | 10/2012 | Heap et al. | |
| 8,371,230 B2 | 2/2013 | Kumar | |
| 8,381,851 B2 | 2/2013 | Gray, Jr. | |
| 8,467,924 B2 | 6/2013 | Shiba | |
| 8,549,838 B2 | 10/2013 | Sujan et al. | |
| 8,695,739 B2 | 4/2014 | Waszak et al. | |
| 8,713,934 B2 | 5/2014 | Berchowitz | |
| 8,726,661 B2 | 5/2014 | Spicer et al. | |
| 8,741,466 B2 | 6/2014 | Youngs et al. | |
| 8,742,701 B2 | 6/2014 | Sujan et al. | |
| 8,812,203 B2 | 8/2014 | Minamikawa et al. | |
| 8,860,381 B2 | 10/2014 | Holliday | |
| RE45,431 E | 3/2015 | King et al. | |
| 9,063,829 B2 | 6/2015 | Yu et al. | |
| 9,109,533 B2 | 8/2015 | Budliger et al. | |
| 9,296,312 B2 | 3/2016 | Zhao | |
| 9,394,851 B2 | 7/2016 | Steiner et al. | |
| 9,555,681 B2 | 1/2017 | Klein | |
| 10,543,833 B2 | 1/2020 | Colavincenzo et al. | |
| 2008/0276610 A1 | 11/2008 | McDowell | |
| 2009/0090573 A1 | 4/2009 | Boone | |
| 2010/0198439 A1 | 8/2010 | Ishii | |
| 2010/0287936 A1 | 11/2010 | Klutchenko | |
| 2011/0168467 A1 | 7/2011 | Kamen et al. | |
| 2014/0069354 A1 | 3/2014 | Pellizzari | |
| 2014/0257612 A1 | 9/2014 | Liu et al. | |
| 2015/0152809 A1 | 6/2015 | Langenfeld et al. | |
| 2017/0138302 A1 | 5/2017 | Leon-Rovira et al. | |
| 2018/0058295 A1 | 3/2018 | Junio et al. | |
| 2019/0054827 A1 | 2/2019 | Jiang et al. | |

FOREIGN PATENT DOCUMENTS

| | | | |
|---|---|---|---|
| CN | 101592098 A | 12/2009 | |
| CN | 101915147 A | 12/2010 | |
| CN | 102434310 A | 5/2012 | |
| CN | 104763553 A | 7/2015 | |
| CN | 103890365 B | 1/2016 | |
| CN | 104727871 B | 10/2017 | |
| CN | 106351765 B | 10/2017 | |
| CN | 106230011 B | 12/2018 | |
| KR | 101029753 B1 | 4/2011 | |
| KR | 101317367 B1 | 10/2013 | |
| NL | 1039748 C2 | 1/2014 | |
| TW | I599715 B | 9/2017 | |
| WO | WO-2009007209 A2 * | 1/2009 | ............ B60K 6/22 |
| WO | 2012047124 A1 | 4/2012 | |
| WO | 2018195619 A1 | 11/2018 | |

OTHER PUBLICATIONS

Sandru, Ovidiu. "DEKA Revolt: First Hybrid Stirling Engine Car—Powered by Anything!" The Green Optimistic, Nov. 11, 2008, www.greenoptimistic.com/deka-revolt-stirling-engine-car-20081111/.

Flannery, Barry, et al. "Hybrid Stirling Engine-Adsorption Chiller for Truck Auxiliary Power Unit Applications." International Journal of Refrigeration, vol. 76, 2017, pp. 356-366., doi:10.1016/j.ijrefrig.2017.02.015.

Hodgkins, Kelly. "Man Builds 100mpg Engine Using 200-Year-Old Technology." Fox News, FOX News Network, Jun. 15, 2016, www.foxnews.com/auto/man-builds-100mpg-engine-using-200-year-old-technology.

* cited by examiner

EXTERNAL COMBUSTION ENGINE SERIES HYBRID ELECTRIC DRIVETRAIN

CROSS-REFERENCE TO RELATED APPLICATION

This application is a national stage filing of PCT/US18/57892, filed on Oct. 27, 2018, having the same inventors and the same title, and which is incorporated herein by referenced in its entirety; which claims the benefit of priority from U.S. provisional application No. 62/578,348, filed Oct. 27, 2017, having the same inventors and the same title, which is incorporated herein by referenced in its entirety.

FIELD OF THE DISCLOSURE

The present disclosure pertains generally to hybrid vehicles, and more particularly to an external combustion engine series hybrid electric drivetrain for the same.

BACKGROUND OF THE DISCLOSURE

Conventional parallel and series hybrid drivetrain designs produce electrical energy by employing an internal combustion engine to drive a generator by means of a driveshaft. The internal combustion engine may be based upon the Diesel Cycle or the Otto Cycle. Both the Diesel Cycle and the Otto Cycle rely upon the motion of internal pistons to derive mechanical energy by means of the explosive combustion of a fuel/air mixture under compression. Consequently, the exhaust gases contain significant amounts of toxic gases such as Carbon Monoxide, Oxides of Nitrogen ($NO_x$) and particulate pollution, which are subsequently expelled into the atmosphere.

The thermal efficiency of both the production line Diesel Cycle and the Otto Cycle at steady state can only achieve a maximum thermal efficiency of 26%, since the majority of the energy in the fuels used in these cycles is lost as waste heat. Most hybrid automotive vehicles do not run their internal combustion engines at a steady state of operation at the idealized "sweet spot" of maximum efficiency, because they are configured in a parallel hybrid configuration. This necessitates varying the speed of operation of the engine, which significantly reduces the overall thermal efficiency of the vehicle, and under heavy engine load produces higher levels of tailpipe emissions.

Diesel electric locomotives commonly utilize a series hybrid configuration, which results in a more efficient operation of the engine. However, atmospheric pollutants in the form of $NO_x$ compounds, and particulate pollutants in the exhaust emission, remain problematic.

The improved efficiency of the modern Stirling Cycle engine was demonstrated by the National Aeronautics and Space Administration (NASA) in the 1980s during the Automotive Stirling Engine (ASE) Project. The Stirling Cycle engine used in that project achieved an average of 38% thermal efficiency. This project employed the Stirling Cycle engine in a direct drive configuration, which resulted in a doubling of the average fuel efficiency over the commercially available internal combustion Otto Cycle engines of the time. The NASA ASE Project achieved significant reduction in tailpipe emissions. However, the project encountered two significant problems which negatively impacted the commercial viability of this design. In particular, the configuration of the direct drive approach resulted in sluggish acceleration of the test vehicles, and the engine required approximately five minutes to warm up before a sustained Stirling Cycle could be initiated. At the time of the NASA ASE Project, there was no practical nor cost effective solution to these problems.

Predating the NASA project in the early Twentieth Century, a steam driven automobile was marketed by Stanley Motor Carriage Company. The Stanley Motor Vehicle, which is described in U.S. Pat. No. 657,711 (Stanley et al.), was a Rankine Cycle engine in a direct drive configuration not unlike the piston driven steam locomotives of the same era. This approach to automotive science also had the same problems that the NASA ASE Project encountered, namely, a significant warm-up period and sluggish acceleration. In light of the fact that the Stanley Motor Vehicle was an improvement over the horse drawn carriage, the issues of sluggish acceleration and significant warm-up period seemed inconsequential until the design was eclipsed by the very popular mass-produced Model T Ford. By the mid twentieth century, the Rankin Cycle was no longer commercially employed in the transportation sector of the United States in either railroads or automobiles. In the modern era, the Rankine Cycle is employed in steam turbine generators for electrical power generation and has been found to have a 38% thermal efficiency.

Another type of external combustion engine was developed in the early Twentieth Century by Nikola Tesla. This engine, which was known as the bladeless turbine, is described in U.S. Pat. No. 1,061,206 (Tesla). The bladeless turbine took advantage of the Boundary Layer Effect to rotate discs in the turbine cylinder. The bladeless turbine was very successful as a pump, but metallurgy of that era could not accommodate a thin enough blade to take advantage of the high temperatures of steam or hot combustion gases of fuels without warping or "potato chipping" the discs. However, the same metal alloys used in modern turbo jet engines can now resolve this problem and, as a result, provide for a very favorable weight to horsepower ratio.

Recent improvements in modern manufacturing process of ultra-capacitors and Lithium Ion batteries and computer control systems have resulted in a commercially viable solution to the problems encountered by the NASA ASE Project. By redesigning the external combustion drivetrain into a series electric hybrid drivetrain, as in the Stirling-electric hybrid automobile described in U.S. Pat. No. 7,726,130 (McDowell), the major problems are resolved. The configuration of a series hybrid-electric automobile drivetrain can employ a number of external combustion engine types such as the Stirling Cycle engine, the Rankine Cycle engine, the Ericsson Cycle engine, the Brayton Cycle engine or the Kalina Cycle engine to turn a generator to provide electrical energy to an electric motor(s) and the plurality of the other electrical systems of the vehicle.

The external combustion hybrid electric drivetrain may also employ batteries of greater energy density, ultra-capacitors and/or other electrical energy storage devices, to resolve the primary issues of long warm-up time periods and sluggish acceleration associated with external combustion engines. A more comprehensive application of these cycles may be employed such that a broader variety of external combustion engines may be employed in a similar fashion to that of the Stirling-electric hybrid automobile described in U.S. Pat. No. 7,726,130 (McDowell). The application of a variety of external combustion engine types and designs (such as, for example, the Stirling Cycle, the Rankine Cycle, the Ericsson Cycle, the Brayton Cycle, and the Kalina Cycle) in a series hybrid-electric configuration for transportation and industry may be applied to all forms of industry and surface transportation, including maritime, resulting in a more fuel-efficient operation while simultaneously reducing emissions.

Information disclosed in this Background of the Invention section is only for enhanced and detailed understanding of the general background of the invention and should not be taken as an acknowledgement, nor any form of suggestion, that this information forms the prior art already known to a person or persons.

The technical problems that the present invention resolves are not limited to those mentioned above, and those that are not mentioned shall be clearly understood by a person skilled in the art by examining the specifications of the present invention.

SUMMARY OF THE DISCLOSURE

In one aspect, a vehicle is provided which comprises an engine; an electric motor; a drivetrain driven by said engine and said electric motor, said drivetrain including a rotatable shaft; a generator which is attached to said rotatable shaft, and which generates electrical energy in response to the rotation of said shaft; an energy recovery system; and an electrical energy storage system.

In another aspect, a method is provided for operating a vehicle. The method comprises providing an external combustion engine and an electric motor which are mechanically coupled to a drivetrain that includes a rotatable shaft; providing an energy recovery system comprising a dynamic braking system, a thermopile array and an electrical storage system; imparting motion to said vehicle by driving said drivetrain with said external combustion engine and said electric motor, wherein driving said drivetrain with said external combustion engine generates a stream of exhaust gases; recovering energy from the imparted motion of the vehicle by utilizing the electric motor as a generator when said dynamic braking system is engaged; recovering energy from the operation of the external combustion engine by using said thermopile array to extract heat (or convert thermal energy) from said stream of exhaust gases and by converting the extracted heat (or extracted thermal energy) into electrical energy by way of the Seebek effect; and storing the energy recovered from the motion of the vehicle and from the operation of the external combustion engine in said electrical storage system.

BRIEF DESCRIPTION OF THE DRAWINGS

A better knowledge of the system, the components of the systems, processes and procedures of the present disclosure may be gained by referring to the drawing figures that illustrate particular non-limiting embodiments of the architectures, components, and functions of a scalable configurable point-of-cyber-access cyber system in accordance with the teachings herein.

DETAILED DESCRIPTION OF THE DISCLOSURE

Figure 1:
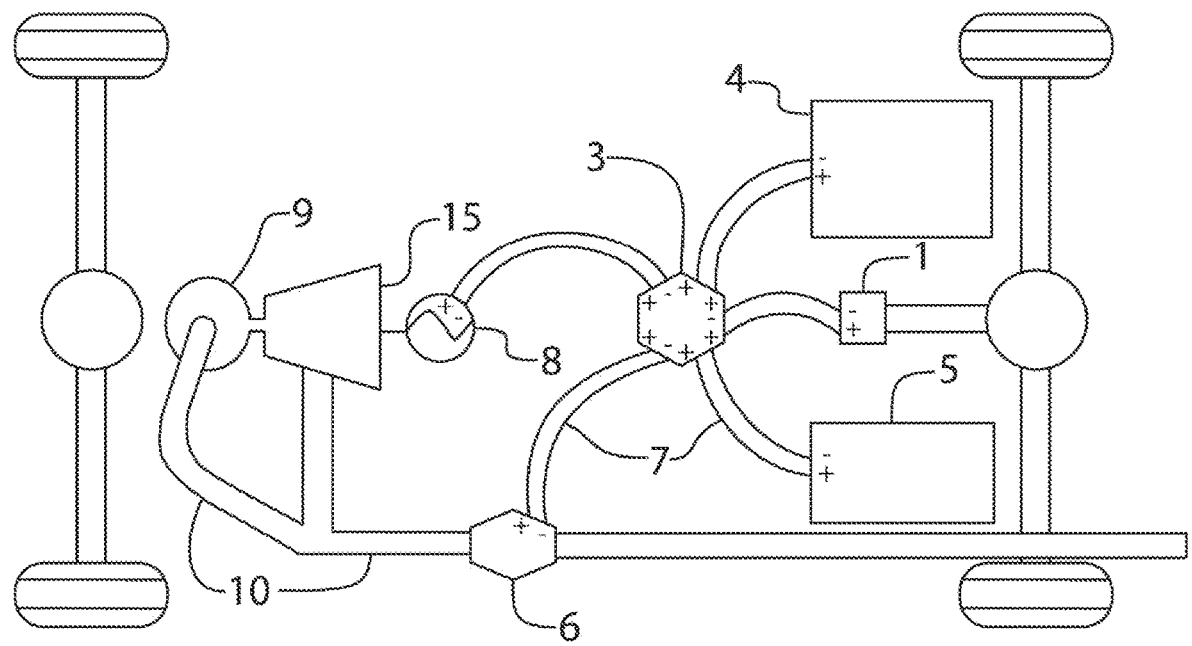
FIG. 1 is diagrammatic representation of the overall configuration of the series electric drivetrain powered by an external combustion engine employing a Rankine Cycle.

While the present invention will be described with reference to preferred embodiments, it will be understood by those who are skilled in the art that various changes may be made and equivalents may be substituted for elements thereof without departing from the scope of the invention. In addition, many modifications may be made to adapt a particular situation or material to the teachings of the invention without departing from the essential scope thereof. It is therefore intended that the present invention not be limited to the particular embodiments disclosed as the best mode contemplated for carrying out this invention, but that the invention will include all embodiments and legal equivalents thereof as may be comprehended by the claims herein.

An external combustion engine burns fuel at atmospheric pressure outside the power cylinders of the engine. Thermal energy is transferred to a working fluid or motive gas in the power cylinders by conduction through a heater tube wall or heat exchanger. One example of a rudimentary external combustion engine design is The Stanley Motor Vehicle. By contrast, one of the most advanced external combustion engine designs is the power plant of a nuclear submarine. Despite the sophistication of the latter with respect to the former, the operating principles are the same for both designs. The typical design of an external combustion engine has significantly fewer moving parts than an internal combustion engine, and hence exhibits comparatively lower frictional losses. External combustion engine designs can be based upon various thermodynamic cycles including, for example, the Rankine Cycle, the Stirling Cycle, the Ericsson Cycle, the Brayton Cycle and the Kalina Cycle.

Combustion of hydrocarbon fuels at atmospheric pressure produces minimal amounts of Oxides of Nitrogen ($NO_x$) in the emissions of the exhaust gases from external combustion engines. This is true regardless of the variety of the engine, or the thermodynamic cycle upon which it is based. The efficiency of these external combustion cycles, in modern configurations, are typically superior to the efficiency of internal combustion cycles. This result is due, at least in part, to the fact that the external combustion cycle engine is a heat engine where a working fluid or motive gas is contained internally, and derives the thermal energy from chemical combustion or nuclear reaction—external to the motive gas or working fluid—by conduction through the wall of the heater tubes or heat exchanger. The working fluid or motive gas expands in response to the added thermal energy, which then acts upon the mechanism of the engine (usually a piston or turbine) and produces useful mechanical energy. The working fluid or motive gas may then be cooled, compressed and reused in a closed cycle. Alternatively, in an open cycle engine design, the working fluid may be vented, and cool working fluid may be pulled in from a working fluid reservoir.

The superior efficiency of external combustion engines is due in part to the fact that they have fewer moving parts than internal combustion engines, and thus experience less frictional losses. Additionally, the overall design of the external combustion engine is focused upon the conversion the thermal energy of combustion into work rather than the intermittent explosive force of a fuel/air mixture under compression in a cylinder, as in the internal combustion engine designs. It is for this reason that modern external combustion engines are more efficient than internal combustion engines (for example, those based on the Otto Cycle and Diesel Cycle) currently used in commercially available parallel hybrid designs.

In the case of employing external combustion to rotate a bladeless turbine, the turbine may derive mechanical energy from the thermal expansion of the gases produced from the combustion of a stoichiometrically balanced fuel/air mixture or steam. The hot expanding gases rotate the discs of the bladeless turbine by means of the boundary layer effect as the hot gases flow in a vortexual pattern toward the exhaust port in the center of the bladeless turbine cylinder casing. Additionally, mechanical energy may be derived from the rotation of the discs in the turbine by employing external combustion cycles such as the Rankine Cycle or the Kalina Cycle. The rotation of the discs can be used to turn an electrical generator(s) to produce electrical energy in a series hybrid-electric drivetrain.

FIG. 1 is a diagrammatic representation of the overall configuration of a series electric drivetrain in accordance with the teachings herein which is powered by an external combustion engine employing a Rankine Cycle. The engine may be in an open or close cycle configuration. Mechanical energy is imparted to the wheels of the vehicle by means of an electric motor 1. The electrical current is regulated and distributed throughout the electrical system of the vehicle by means of a solid state switching device 3. Electrical energy for the vehicle's electrical system may be stored in an energy storage system, and/or withdrawn from an energy storage system, by means of batteries 4 and/or ultra-capacitors 5. Additional electrical energy may be generated by means of a thermopile device 6, which converts thermal energy from the exhaust gases and/or spent steam into electrical energy by employing the Seebeck effect. Electrical current may be conducted to and from the various components of the vehicle's electrical system by means of wiring 7. Electrical energy may be generated by means of a generator or dynamo 8, which is attached to a steam turbine 15 by way of a rotating drive shaft. Motive gas for the turbine 15 (in the form of steam) is produced in a boiler 9 from the thermal energy generated in a combustion chamber. Both spent steam and/or exhaust gases from combustion may exit to the thermopile device 6 by means of piping or conduit 10.

Figure 2:
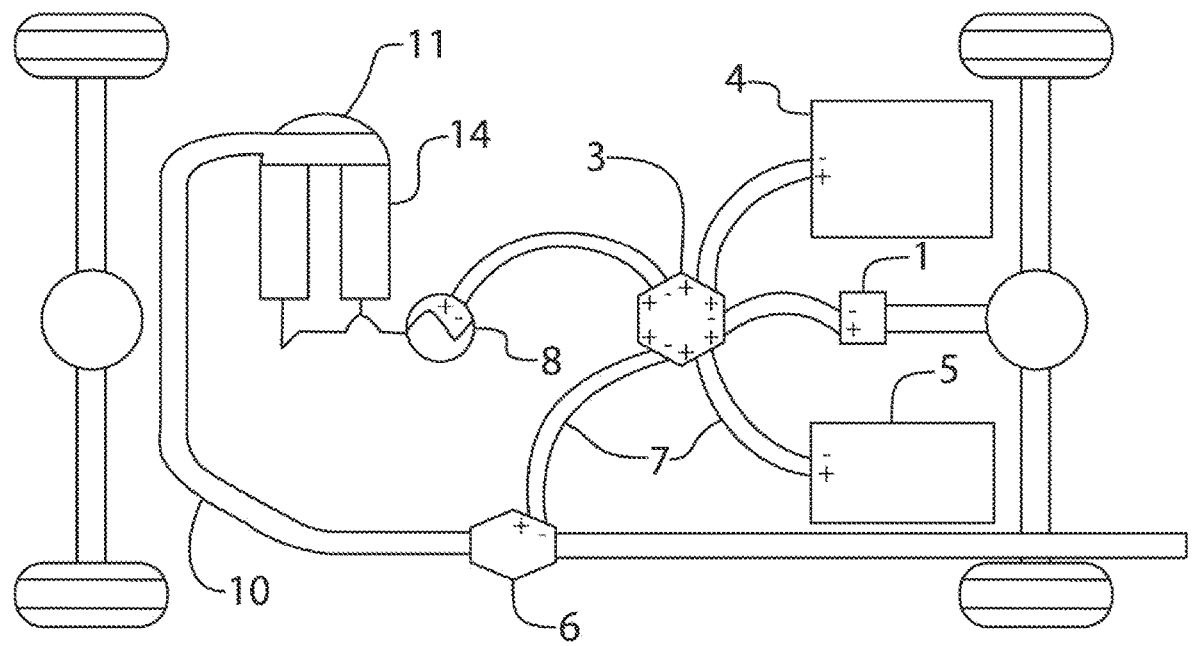
FIG. 2 is a diagrammatic representation of the overall configuration of the series electric drivetrain powered by an external combustion engine employing a Stirling Cycle engine.

FIG. 2 is a diagrammatic representation of the overall configuration of a series electric drivetrain in accordance with the teachings herein which is powered by an external combustion engine employing a Stirling Cycle engine. Mechanical energy is imparted to the wheels of the vehicle by means of an electric motor 1. The electrical current is regulated and distributed throughout the electrical system of the vehicle by means of a solid state switching device 3. Electrical energy for the vehicle's electrical system may be stored in an energy storage system, and/or withdrawn from an energy storage system, by means of batteries 4 and/or ultra-capacitors 5. Additional electrical energy may be generated by means of a thermopile device 6, which converts thermal energy from the exhaust gases into electrical energy by employing the Seebeck effect. Electrical current may be conducted to and from the various components of the vehicle electrical system by means of wiring 7. Electrical energy may be generated by means of a generator or dynamo 8, which is attached to a Stirling Cycle engine 14 by means of a rotating drive shaft. Thermal energy for the motive gas is produced in a combustion chamber 11. Exhaust gases from the combustion chamber 11 exit to the thermopile device 6 by means of piping or conduit 10.

Figure 3:
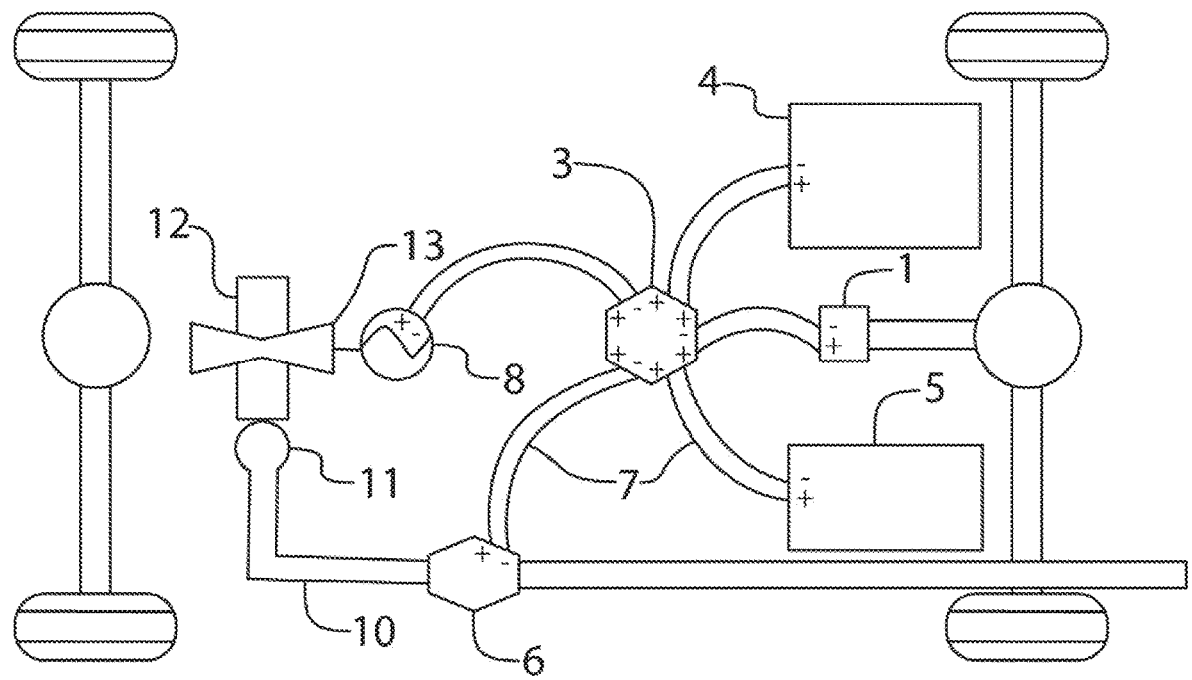
FIG. 3 is a diagrammatic representation of the overall configuration of the series electric drivetrain powered by an external combustion engine employing the Kalina Cycle engine.

FIG. 3 is a diagrammatic representation of the overall configuration of the series electric drivetrain in accordance with the teachings herein which is powered by an external combustion engine employing the Kalina Cycle engine. Mechanical energy is imparted to the wheels of the vehicle by means of an electric motor 1. The electrical current is regulated and distributed throughout the electrical system of the vehicle by means of a solid state switching device 3. Electrical energy for the vehicle's electrical system may be stored in an energy storage system, and/or withdrawn from an energy storage system, by means of batteries 4 and/or ultra-capacitors 5. Additional electrical energy may be generated by means of a thermopile device 6, which converts thermal energy from the exhaust gases into electrical energy by employing the Seebeck effect. Electrical current may be conducted to and from the various components of the vehicle's electrical system by means of wiring 7. Electrical energy may be generated by means of a generator or dynamo 8, which is attached to a Kalina Cycle engine (which engine includes a compressor 12 and a Kalina turbine 13) by means of a rotating drive shaft. Motive gas for the Kalina turbine may be produced in a closed-circuit boiler from the thermal energy generated in a combustion chamber 11. Exhaust gases from combustion chamber 11 may exit to the thermopile device 6 by means of piping or conduit 10.

Figure 4:
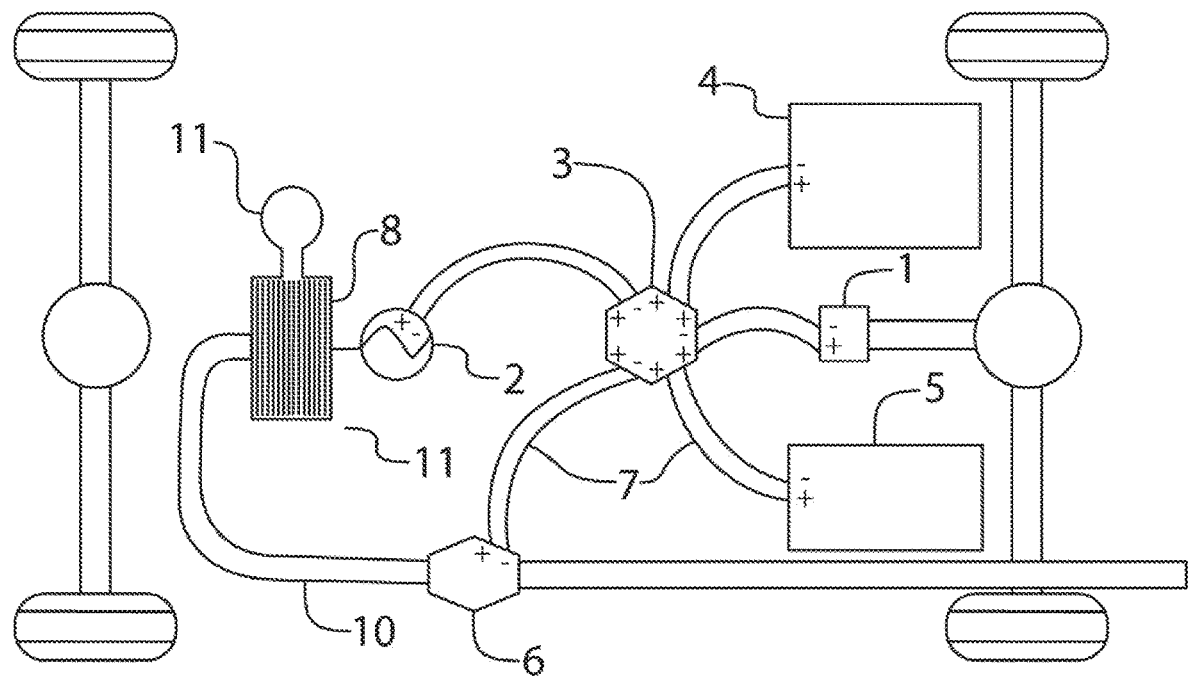
FIG. 4 is a diagrammatic representation of the overall configuration of the series electric drivetrain powered by a bladeless turbine, using combustion gases to provide mechanical energy to the axis of the turbine discs.

FIG. 4 is a diagrammatic representation of the overall configuration of a series electric drivetrain in accordance with the teachings herein which is powered by a bladeless turbine 8, using combustion gases to provide mechanical energy to the axis of the turbine discs. Mechanical energy is imparted to the wheels of the vehicle by means of an electric motor 1. The electrical current is regulated and distributed throughout the electrical system of the vehicle by means of a solid state switching device 3. Electrical energy for the vehicle's electrical system may be stored in an energy storage system, and/or withdrawn from an energy storage system, by means of batteries 4 and/or ultra-capacitors 5. Additional electrical energy may be generated by means of a thermopile device 6, which converts thermal energy from the exhaust gases to electrical energy by employing the Seebeck effect. Electrical current may be conducted to, and from, the various components of the vehicle's electrical system by means of wiring 7. Electrical energy may be generated by means of a generator or dynamo 8, which is attached to a bladeless turbine 15 by means of a rotating drive shaft. Motive gas from combustion is produced in a combustion chamber 11, which may produce rotating mechanical energy by means of the boundary layer effect along the surfaces of the turbine discs. Exhaust gases from combustion chamber 11 exit to the thermopile device 6 by means of piping or conduit 10.

Figure 5:
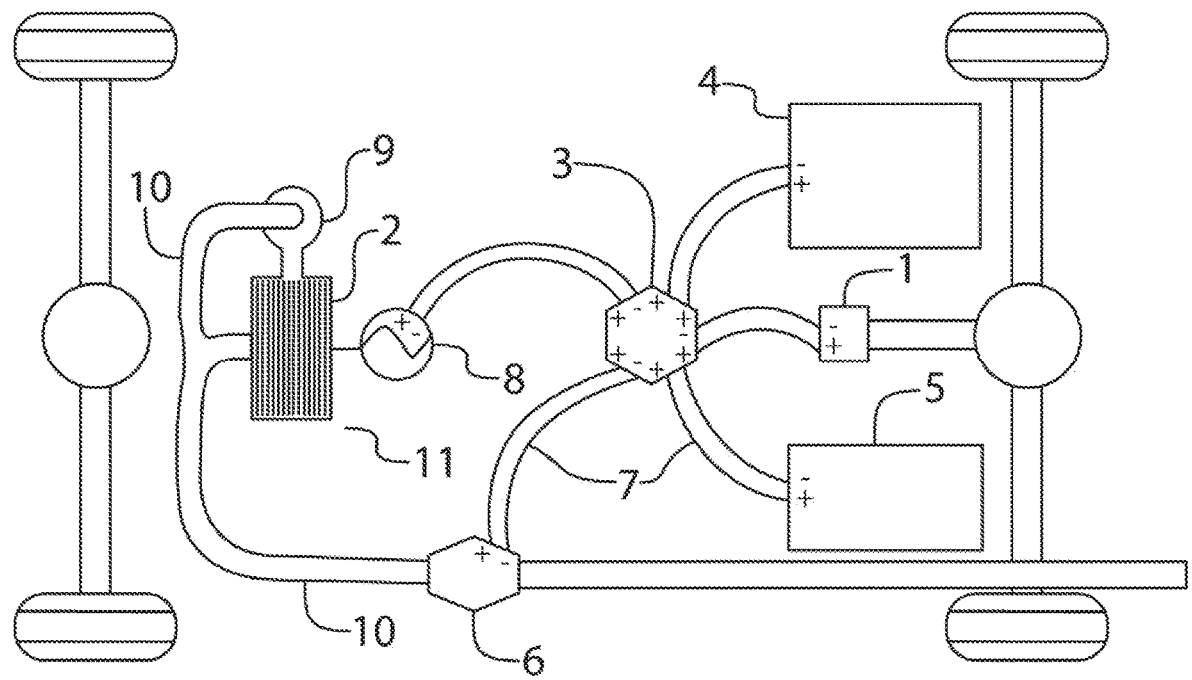
FIG. 5 is a diagrammatic representation of the overall configuration of the series electric drivetrain powered by a bladeless turbine using either an open or closed steam cycle to provide the rotational mechanical energy to the axis of the turbine discs.

FIG. 5 is a diagrammatic representation of the overall configuration of a series electric drivetrain in accordance with the teachings herein which is powered by a bladeless turbine using either an open or closed steam cycle to provide the rotational mechanical energy to the axis of the turbine discs 8. Mechanical energy is imparted to the wheels of the vehicle by means of an electric motor 1. The electrical current is regulated and distributed throughout the electrical system of the vehicle by means of a solid state switching device 3. Electrical energy for the vehicle's electrical system may be stored in an energy storage system, and/or withdrawn from an energy storage system, by means of batteries 4 and/or ultra-capacitors 5. Additional electrical energy may be generated by means of a thermopile device 6, which converts thermal energy from the exhaust gases and/or spent steam into electrical energy by employing the Seebeck effect. Electrical current may be conducted to and from the various components of the vehicle's electrical system by means of wiring 7. Electrical energy may be generated by means of a generator or dynamo 8, which is attached to a bladeless turbine 2 by means of a rotating drive shaft. Motive gas, in the form of steam, is produced in a boiler 9 by means of thermal energy produced in a combustion chamber. Rotational mechanical energy may be produced as the motive gas travels along the surface of the turbine discs by means of the boundary layer effect along the surfaces of the turbine discs. Exhaust gases from combustion and/or spent steam exit to the thermopile device 6 by means of piping or conduit 10.

Various embodiments of the invention may be equipped with one or more external combustion engines, which may be selected from the group consisting of Rankine Cycle engines, Stirling Cycle engines Ericsson Cycle engines, Brayton Cycle engines and Kalina Cycle engines. These external combustion engines may be mechanically coupled with, and provide mechanical energy to, one or more electrical generators/starters for the production of electrical energy. The electrical energy so produced may then be utilized for the electrical system of a vehicle to provide for useful mechanical energy. The vehicle may be, for example, a vehicle for industrial applications of remote or auxiliary electrical power generation, heavy equipment, a light-duty or heavy-duty vehicle, or a maritime vessel.

The external combustion engines disclosed herein may employ various thermodynamic cycles including, for example, the Stirling Cycle, the Rankine Cycle, the Ericsson Cycle, the Brayton Cycle, or the Kalina Cycle. Alternatively, these external combustion engines may supply mechanical energy by employing a bladeless turbine. This bladeless turbine may be driven by means of combustion gases or steam. Preferably, the bladeless turbine cylinder is equipped with a plurality of discs, and the bladeless turbine is driven by working fluids which pass along the surfaces of the plurality of discs and induce rotational motion in the turbine by means of the Boundary Layer Effect. The external combustion engine may be operated in a steady state at a fixed rotational speed to achieve optimal thermal efficiency. The rotating shaft of the external combustion engine may be connected to an electrical generator/starter by means of a reduction gear.

This configuration may be expanded to a plurality of external combustion engines. In such embodiments, all of these external combustion engines may drive generators/starters which may be controlled electronically by a plurality of solid state electrical current regulators such that the electrical cycles and currents are in phase and are balanced from one generator to the next.

The electrical energy produced by the electrical generator may be connected to one or more solid state switching devices selected from the group consisting of electrical current regulators, insulated gate bi-polar transistors and other solid state switching devices. Electrical energy may be directed to the electrical motor(s) and/or throughout the electrical system in accordance with the algorithm of the computer controller. The electric motor(s) may be used to produce useful mechanical energy which drives one or more rotating shafts to provide useful mechanical energy for heavy equipment, light and heavy-duty vehicles, maritime vessels, or other industrial applications.

In addition to the generator(s)/starter(s) providing electrical energy to the electric motor(s), the electrical current regulator(s) and/or insulated gate bi-polar transistor(s) and/or other solid state switching device(s), electrical energy may be directed in accordance with the algorithm of the computer controller to provide electrical energy to the other electrical systems including, but not limited to, a plurality of batteries and/or capacitors and/or other devices, to store electrical energy for subsequent use as needed to provide for the variable demands of operation of the external combustion hybrid-electric drivetrain and for the plurality of other electrically powered systems (e.g. fuel pumps, combustion air blowers, compressors, circulating pumps, hydraulic pumps, cooling fans, climate control, lighting, accessories, etc.).

Exhaust gases and spent steam from the external combustion engine may be directed by means of a manifold, conduit or piping through a plurality of thermopile array(s) where thermal energy from the exhaust gases may be harvested and converted to electricity by means of the Seebeck Effect. The electrical energy derived from a plurality of thermopile array(s) may be routed to the electrical system in accordance with the algorithm of a computer controller through the electrical current regulator(s) and/or insulated gate bi-polar transistor(s) and/or other solid state switching device(s).

The algorithm of the computer controller may include subroutines that reduce fuel consumption through the application of dynamic braking as well as an all-electric mode of operation when there is no combustion in the external combustion drivetrain, and other low demand operations of the external combustion engine(s).

While the above description contains certain specifics, these should not be construed as limitations on the scope of the invention, but rather as an exemplification of one preferred embodiment thereof. Accordingly, the scope of the present invention should be determined not by the embodiment(s) illustrated, but by the claims and their legal equivalents which may herein after be granted upon applications having priority.

The novel adaptation of the devices and techniques disclosed herein represent an improvement upon the art for surface transportation and industrial applications by adapting external combustion engine drivetrains in a series hybrid-electric configurations to achieve greater thermal efficiency and a significant reduction of emissions of particulate pollution, toxic gases and $NO_x$ compounds.

The systems, methodologies and devices disclosed herein are applicable to a broad range of applications. These include, without limitation, construction machinery and vehicles such as, for example, articulated trucks, pavers, cold planars, scrapers, compactors, loaders (including, for example, knuckleboom loaders, track loaders, multi-terrain loaders, underground loaders, backhoe loaders, wheel loaders and skid steer loaders), dozers, draglines, drills, rope shovels, excavators, feller bunchers, forest machines, forwarders, harvesters, mining shovels, material handlers, graders, on-highway and off-highway trucks, pipelayers, road reclaimers, tractors, farm tractors, skidders, and telehandlers. These also include aviation ground support vehicles including, for example, re-fuelers, tugs and tractors, ground power units, buses, container loaders, transporters, air start units, water trucks, lavatory service vehicles, catering vehicles, belt loaders, deicing or anti-icing vehicles, and aircraft rescue or firefighting vehicles. These further include trucks such as, for example, box trucks, concrete mixers, dump trucks, flatbeds, semi-tractors, tank trucks and wreckers. These further include merchant vessels such as, for example, dry cargo ships (including bulk carriers and container ships), tankers, coasters and passenger ships.

The engines disclosed herein may utilize various types of fuel applicators. These include, for example, fuel injectors, fuel vaporizers and fuel atomizers (such as, for example, swirl atomizers).

The systems and devices disclosed herein may incorporate various electrical components as are known to the art. For example, these systems and devices may require conversion of DC power to AC power, or from AC power to DC power, and may thus incorporate one or more power inverters.

Various design configurations for Stirling engines may be utilized in the systems, devices and methodologies described herein. These include, but are not limited to, Alpha, Beta, Gamma, and free piston design configurations and variations thereof.

The vehicles disclosed herein may have various electrical systems, some or all of which may be powered by an electrical motor or by one or more energy storage devices. These include, without limitation, electrical systems selected from the group consisting of electric motors, fuel pumps, air blowers (including, for example, atomizing air blowers, motive air blowers and combustion air blowers), fuel applicators, compressors, circulating pumps, hydraulic pumps, cooling fans, climate control systems, and lighting and electrical accessories.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims.

What is claimed is:

1. A vehicle, comprising:
an engine equipped with at least one combustion chamber which receives a mixture of fuel and air that undergoes combustion in the at least one combustion chamber in accordance with an ignition sequence;
a computerized controller which is equipped with a tangible, non-transient medium and which controls the ignition sequence in accordance with an algorithm recorded in said medium;
a temperature sensor which is disposed in said engine and which is in communication with said controller, wherein said controller maintains the engine in an inactive state until the temperature sensed by said temperature sensor exceeds a predetermined threshold value;
an electric motor;
a drivetrain driven by said engine and said electric motor, said drivetrain including a rotatable shaft;
a generator which is attached to said rotatable shaft, and which generates electrical energy in response to the rotation of said shaft;
an energy recovery system; and
an electrical energy storage system;
wherein said controller transitions the engine to an active state when the temperature sensed by said temperature sensor exceeds the predetermined threshold value; and
wherein said controller transitions the engine to an active state by reversing the electrical current flow from a plurality of electrical storage devices to a generator/starter, thereby rotating said shaft and establishing a sustained external combustion cycle, and wherein the motor is operable, while the engine is in an inactive state but after the ignition sequence is initiated, from a first flow of electric energy from the plurality of electrical storage devices to said motor as directed by the algorithm.

2. The vehicle of claim 1, wherein said engine is based on an external combustion cycle selected from the group consisting of Stirling Cycles, Rankine Cycles, Ericsson Cycles, Brayton Cycles and Kalina Cycles.

3. The vehicle of claim 1, wherein said engine includes a bladeless turbine which produces mechanical energy by means of a boundary layer effect.

4. The vehicle of claim 1, wherein said energy recovery system comprises a thermopile array employing a Seebeck Effect, and wherein said thermopile array is in electrical contact with said electrical storage system.

5. The vehicle of claim 4, wherein said energy recovery system further comprises a dynamic braking system which utilizes said electric motor as a generator when said dynamic braking system is engaged, and wherein said thermopile array extracts heat from exhaust gases generated by said engine and converts the extracted heat into electrical energy by way of the Seebeck effect.

6. The vehicle of claim 1, further comprising:
at least one electrical device selected from the group consisting of current regulators, insulated gate bipolar transistors and solid state switching devices;
a plurality of electrical systems; and
a controller which controls said electric motor in accordance with an algorithm;
wherein electrical energy generated by said generator is routed through said at least one electrical device to said plurality of electrical systems to operate said electric motor in accordance with said algorithm.

7. The vehicle of claim 1, wherein said engine includes a plurality of parallel external combustion engines equipped with at least one electrical generating element, wherein said plurality of parallel external combustion engines operate simultaneously with said at least one electrical generating element to generate electrical energy, wherein the generated electrical energy is routed through at least one solid state switching device, and wherein electrical energy generated by said generator is routed through said at least one electrical generating element to a plurality of electrical systems to operate said electric motor in accordance with an algorithm.

8. The vehicle of claim 6, further comprising:
a plurality of electrical storage devices;
a solid state switching device; and
a computerized controller;
wherein electricity generated by said generator is directed to said plurality of electrical storage devices for storage by means of said solid state switching device under the control of said controller as directed by said algorithm.

9. The vehicle of claim 1, further comprising:
a series hybrid electric drivetrain;
a solid state switching device; and
a computerized controller;
wherein said generator is in electrical communication with said series hybrid electric drivetrain, and wherein said solid state switching device is wherein said controller is a computerized controller which controls said solid state switching device by way of a software control algorithm.

10. The vehicle of claim 1, wherein said threshold temperature is a suitable operating temperature for initiating a sustained external combustion cycle selected from the group consisting of Stirling Cycles, Ericsson Cycles, Brayton Cycles, Rankine Cycles and Kalina Cycles.

11. The vehicle of claim 3, wherein said threshold temperature is a temperature at which sufficient motive gas or working fluid is flowing for the rotation of the bladeless turbine by means of a boundary layer effect from expanding combustion gases or steam.

12. The vehicle of claim 1, wherein said controller transitions the engine to an active state when the temperature sensed by said temperature sensor exceeds the predetermined threshold value.

13. The vehicle of claim 1 wherein, when the engine is in an active state, said controller reverses said first flow of electrical energy from said engine/generator to said electrical storage devices as directed by the algorithm.

14. The vehicle of claim 1, further comprising:
an exhaust conduit, manifold or piping which directs exhaust gases or spent steam away from said engine;
a thermopile array configured to extract thermal energy from said exhaust conduit, manifold or piping and to convert said thermal energy into electrical energy by way of a Seebeck effect;
a solid state switching device; and
a computerized controller which controls the solid state switching device as directed by the algorithm.

15. The vehicle of claim 8, further comprising:
a series hybrid-electric drivetrain equipped with a plurality of electrical systems;
wherein said plurality of electrical storage devices have sufficient capacity to supply electrical energy demands of the plurality of electrical systems of the series hybrid-electric drivetrain for at least a predetermined minimum period of time under normal operating conditions.

16. The vehicle of claim 8, further comprising:
an exhaust conduit, piping or manifold which directs exhaust gases or spent steam away from said engine;
a thermopile array configured to extract thermal energy from said exhaust conduit, piping or manifold and to convert said thermal energy into electrical energy by way of a Seebeck effect;
a solid state switching device; and
a computerized controller which is equipped with a tangible, non-transient medium and which controls the switching device and a shut-down sequence and start-up sequence of a series hybrid-electric drivetrain in accordance with an algorithm recorded in said medium;
wherein, upon the initiation of the shutdown sequence, the engine is directed by the algorithm of a computer controller to continue to operate until sufficient electrical energy has been stored in the plurality of electrical storage devices to operate the series hybrid-electric drivetrain through a subsequent start-up sequence.

17. The vehicle of claim 16 wherein, upon completion of the shutdown sequence, any electrical energy subsequently received from the thermopile array is directed to the plurality of electrical storage devices for storage.

18. A vehicle, comprising:
an engine equipped with at least one combustion chamber which receives a mixture of fuel and air that undergoes combustion in the at least one combustion chamber in accordance with an ignition sequence;
a computerized controller which is equipped with a tangible, non-transient medium and which controls the ignition sequence in accordance with an algorithm recorded in said medium;
a temperature sensor which is disposed in said engine and which is in communication with said controller, wherein said controller maintains the engine in an inactive state until the temperature sensed by said temperature sensor exceeds a predetermined threshold value;
an electric motor;
a drivetrain driven by said engine and said electric motor, said drivetrain including a rotatable shaft;
a generator which is attached to said rotatable shaft, and which generates electrical energy in response to the rotation of said shaft;
an energy recovery system;
an electrical energy storage system;
a series hybrid-electric drivetrain equipped with a plurality of electrical systems;
an exhaust conduit, piping or manifold which directs exhaust gases or spent steam away from said engine;
a thermopile array configured to extract thermal energy from said exhaust conduit, piping or manifold and to convert said thermal energy into electrical energy by way of a Seebeck effect;
a solid state switching device; and
a computerized controller which is equipped with a tangible, non-transient medium and which controls the switching device and a shut-down sequence and start-up sequence of the series hybrid-electric drivetrain in accordance with an algorithm recorded in said medium;
wherein a plurality of electrical storage devices have sufficient capacity to supply electrical energy demands of the plurality of electrical systems of the series hybrid-electric drivetrain for at least a predetermined minimum period of time under normal operating conditions; and
wherein, upon the initiation of the shutdown sequence, the engine is directed by the algorithm of a computer controller to continue to operate until sufficient electrical energy has been stored in the plurality of electrical storage devices to operate the series hybrid-electric drivetrain through a subsequent start-up sequence.

19. The vehicle of claim 18 wherein, upon completion of the shutdown sequence, any electrical energy subsequently received from the thermopile array is directed to the plurality of electrical storage devices for storage.

* * * * *